Jan. 23, 1962     O. PETIT     3,017,994
HEAVY MEDIUM SEPARATION APPARATUS

Filed Dec. 14, 1959     4 Sheets-Sheet 1

INVENTOR.
OMER PETIT
BY Irwin S. Thompson
ATTY.

Jan. 23, 1962     O. PETIT     3,017,994
HEAVY MEDIUM SEPARATION APPARATUS
Filed Dec. 14, 1959     4 Sheets-Sheet 2

INVENTOR.
OMER PETIT
BY Irwin S. Thompson
ATTY.

Jan. 23, 1962     O. PETIT     3,017,994

HEAVY MEDIUM SEPARATION APPARATUS

Filed Dec. 14, 1959     4 Sheets-Sheet 4

INVENTOR.
OMER PETIT
BY
Irwin S. Thompson
ATTY.

United States Patent Office 3,017,994
Patented Jan. 23, 1962

3,017,994
HEAVY MEDIUM SEPARATION APPARATUS
Omer Petit, Ganshoren, Belgium, assignor to CRIBLA Societe Anonyme, Brussels, Belgium
Filed Dec. 14, 1959, Ser. No. 859,250
Claims priority, application Belgium Dec. 22, 1958
2 Claims. (Cl. 209—172)

The present invention relates to plant for the separation of granular products of different specific gravities, with the aid of dense liquids, comprising an apparatus in which a container, fed with a dense liquid and with the granular mixture to be separated, removes the heavy products into an annular rotary drum surrounding it, the drum being provided with vanes conveying the products which fall between them, into a hopper feeding another apparatus which is similar to the first one but is fed with a liquid, denser than that used in the first apparatus, each of the containers being provided with a chute for the removal of flotation products.

Plant of the above type, in which the rotary apparatus as well as the containers are fitted separately, are known. Such plant occupies a relatively large space.

The present invention has for its object to provide plant which is simpler and less costly than those which presently exist.

According to the invention, the annular rotary drum of the second apparatus is disposed alongside the drum of the first apparatus in such a manner that the axis of rotation of these drums is the same.

According to one feature of the invention, the container of the first apparatus is fitted inside the drum of the second apparatus.

According to another feature of the invention, the container of the second apparatus is fitted inside the drum of the first apparatus.

The two containers, which receive the granular mixtures to be separated, have preferably a common wall.

By arranging the containers in the above manner, their flotation surface is increased without increasing the space required by the plant, which fact is very favourable for density separation.

Moreover it is known that to be able to operate a density separation process under favourable conditions, it is desirable to be able to readjust the density of the bath during the course of operation.

The present invention has the further object of providing means for keeping the density of the dense liquid in the container constant, by removing those intermediate portions of the medium, the density of which has increased during the separation process.

According to the invention, the discharge pipes open into the container at different levels.

Other features and details of the invention will appear from the description of the accompanying drawings which show diagrammatically, and by way of example only, an embodiment of a plant according to the invention.

In these various figures, the same reference numbers indicate identical parts.

Figure 1:
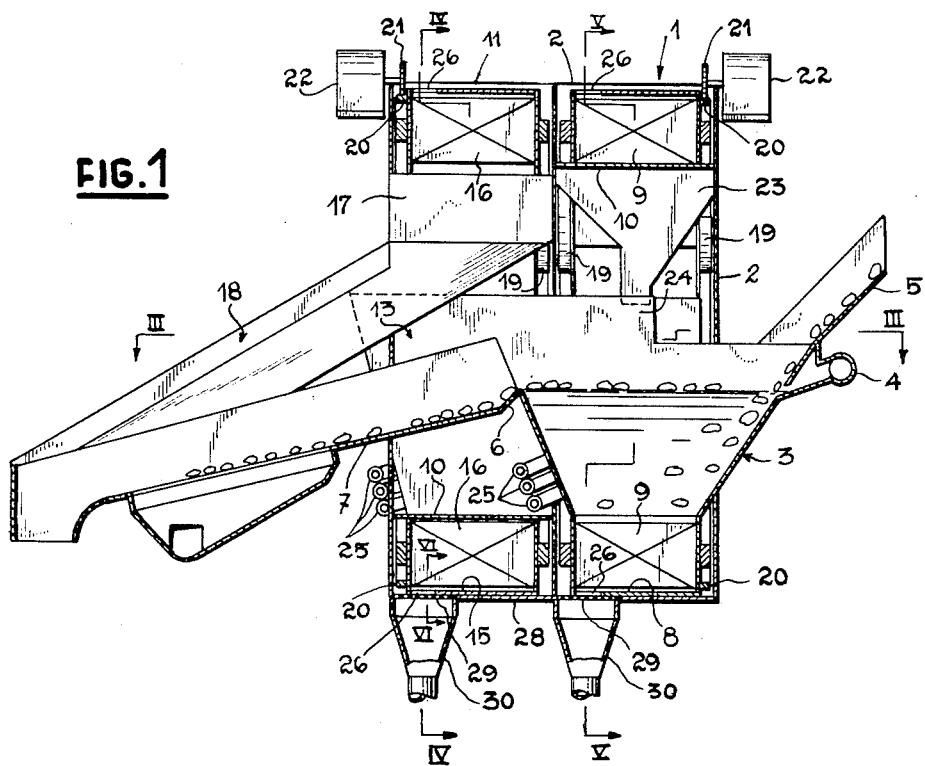
FIGURE 1 is a sectional elevation on line I—I of FIGURE 3.
Figure 2:
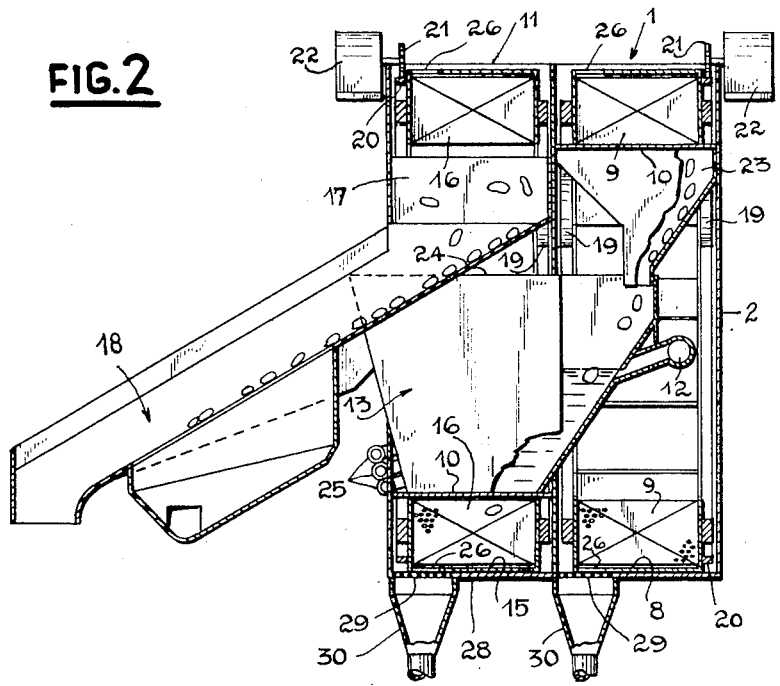
FIGURE 2 is another sectional elevation on line II—II of FIGURE 3.
Figure 4:
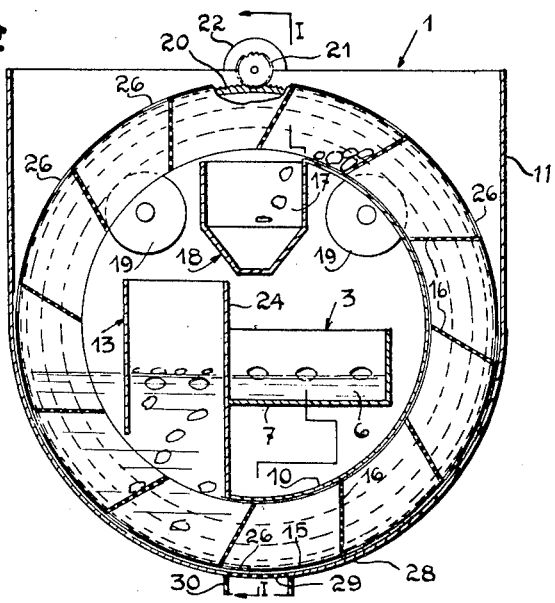
FIGURE 4 is a sectional view on the line IV—IV of FIGURE 1.
Figure 3:
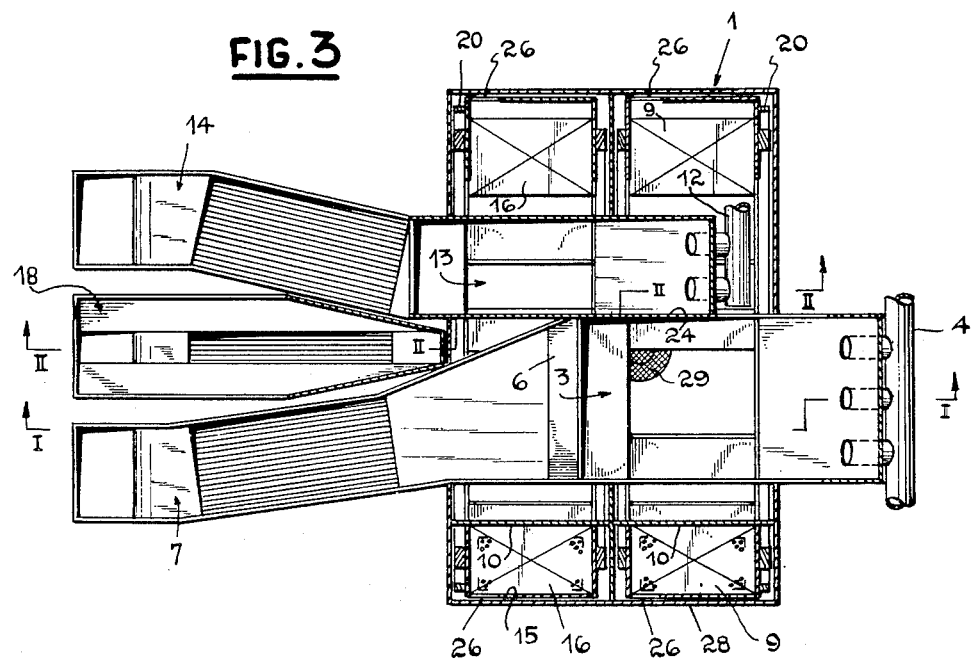
FIGURE 3 is a sectional plan view on the line III—III of FIGURE 1.
Figure 5:
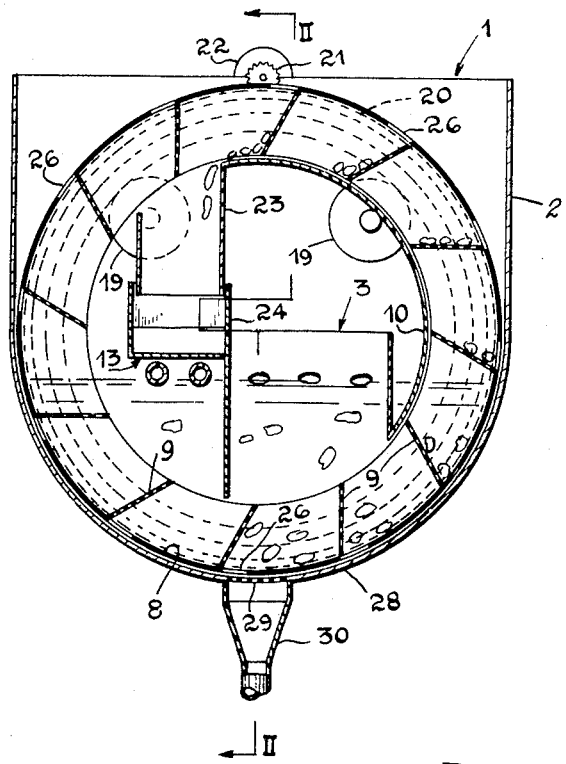
FIGURE 5 is a sectional view on the line V—V of FIGURE 1.
Figure 6:
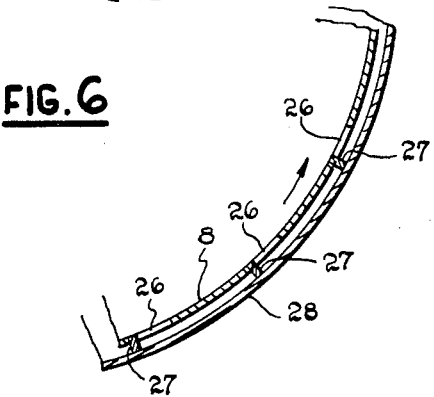
FIGURE 6 is a part sectional view on the line VI—VI of FIGURE 1.

The drawings show a plant 1 for the separation of granular products of different specific weights with the aid of dense liquids. This plant comprises an apparatus 2 in which a container 3 with a perforated bottom is fed with a dense liquid via an inlet pipe 4, and with a granular mixture via an inclined chute 5 on the whole width of the washing bed on the upstream side thereof, causing the products to be treated to plunge into this liquid.

Flotation products in dense liquid in the container are conveyed by an overflow ridge 6 on its downstream end into a discharge passage 7. The heavy products, called "plunging" products, are removed to the lower portion of the container 3 and collected by an annular rotary drum 8 which surrounds the container. The drum 8 is provided with vanes 9, having holes which allow the draining of the products, which are carried up along guide plates 10. These products are then discharged into a second apparatus 11, similar to the first apparatus 2, but fed by a pipe 12 with a liquid which is denser than that used in the first apparatus.

The second apparatus 11 also has a container 13 in which the flotation products and the plunging products are separated.

The flotation products of the container 13 are removed by a passage 14 at the downstream end of said second container, whilst the plunging products are taken up in an annular rotary drum 15, provided with vanes 16, which convey them up and discharge them into a hopper 17 from where they are removed through a passage 18.

According to the invention, the rotary drum 15 is disposed alongside the drum 8 in such a manner that the axis of rotation of these drums is the same. The discharge passage 7 of the overflowed products of the first container extends through the rotary drum 15 in a direction substantially the same as that of the discharge passage 14.

In the embodiment shown, the drums 8 and 15 are supported on rollers 19. These drums are each provided on one side with a toothed annulus 20 which meshes with a pinion 21, mounted on the axis of a motor 22 which serves to rotate the drums.

The upper part of the container 3 of the first apparatus 2 protrudes inside the drum 15 of the second apparatus 11, whilst the upper part of the container 13 of the second apparatus protrudes into the interior of the drum 8 of the first apparatus. Thus the flotation surface of the containers is increased without increasing the space requirement of the assembly.

A hopper 23, receiving the heavy products from the first apparatus, has its discharge end positioned to discharge the products into the second container 13 on the whole width of the washing bed on the upstream end thereof. Said second container 13 has its upstream end positioned out of alignment with the downstream end of the first container.

According to another feature, the container 13 has a wall 24 which is common with container 3.

The passage 18, which removes the heavy products from the second apparatus, is preferably disposed between the discharge passages 7 and 14 for the flotation products of the first and second apparatus.

The discharge passages for the flotation products are provided with apertures and converge towards the outlet thus permitting the draining of the products.

The invention furthermore permits the density of the bath to be adjusted and to be maintained constant. For this purpose there are provided pipes 25, opening into the container at different levels, through which pipes intermediate layers of the medium at increased density can be removed.

The outer wall of the drums 8 and 15, are both provided with apertures 26 and with a scraper 27 near each of these apertures. By scraping the bottom of a casing 23, which surrounds both units these scrapers remove the material which may have penetrated between the outer wall of the drums and the casing. This material is returned to the inside of the drums via the apertures 26, thus avoiding the accumulation of products which might stop the drums.

The casing 28 is provided at its lower part with passages 29 for the escape into chutes 30 of the densest liquids from each of the apparatus.

It will be apparent that the invention is not limited exclusively to the embodiment as shown and that various modifications can be applied to the shape, the arrangement and the constitution of various parts of the structure, without departing from the scope of the present invenion, provided such modifications are not contradictory to the scope of the appended claims.

What I claim is:

1. Plant for the separation of granular products of different specific gravities by means of dense liquids comprising first and second containers each having a washing bed for granular products at the upstream side thereof, means feeding dense liquid into said first container, means feeding said granular products into said first container on the whole width of the washing bed on the upstream side thereof, an overflow for the products floating on said dense liquid at the downstream end of said first container, a discharge passage of the overflowed products, a first annular rotary drum around said first container, an opening at the bottom of said first container permitting the sunken products to be discharged into said first rotary drum, vanes in said rotary drum conveying upwardly the sunken products fallen between the vanes, a hopper receiving the sunken products conveyed upwardly by said vanes, guide plates maintaining these products between the vanes until the products arrive at said hopper with its discharge end positioned to discharge the products into the second container on the whole width of the washing bed at the upstream side thereof, said second container having its upstream end positioned out of alignment with the downstream end of the first container, means feeding said second container with liquid denser than the dense liquid with which the first container is fed, a second overflow for the products floating on this last dense liquid, a second discharge passage at the downstream end of said second container of the products floating on this last dense liquid, a second annular rotary drum around said second container and alongside the first drum, said second rotary drum having the same axis as the first drum and through which the discharge passage of the overflowed products of the first container extends in a direction substantially the same as that of said second discharge passage, an opening at the bottom of said second container permitting the sunken products to be discharged into said second rotary drum, vanes in this second rotary drum conveying upwardly the sunken products fallen between the vanes, and a discharge passage receiving these last products, disposed beside the discharge passages for the flotation products of the first and second containers.

2. Plant for the separation of granular products of different specific gravities by means of dense liquids comprising first and second containers each having a washing bed for granular products at the upstream side thereof, means feeding dense liquid into said first container, means feeding said granular products into said first container on the whole width of the washing bed on the upstream side thereof, an overflow for the products floating on said dense liquid at the downstream end of said first container, a discharge passage of the overflowed products, a first annular rotary drum around said first container, an opening at the bottom of said first container permitting the sunken products to be discharged into said rotary drum, vanes in said rotary drum conveying upwardly the sunken products fallen between the vanes, a hopper receiving the sunken products conveyed upwardly by said vanes, guide plates maintaining these products between the vanes until the products arrive at said hopper with its discharge end positioned to discharge the products into the second container on the whole width of the washing bed at the upstream side thereof, said second container having its upstream end positioned out of alignment with the downstream end of the first container and protruding partially within the first annular drum, means feeding said second container with liquid denser than the dense liquid with which the first container is fed, a second overflow for the products floating on this last dense liquid, a second discharge passage at the downstream end of said second container of the products floating on this last dense liquid, a second annular rotary drum around said second container and alongside the first drum, said second rotary drum having the same axis as the first drum and through which the discharge passage of the overflowed products of the first container extends in a direction substantially the same as that of said second discharge passage, an opening at the bottom of said second container permitting the sunken products to be discharged into said second rotary drum, vanes in this second rotary drum conveying upwardly the sunken products fallen between the vanes, and a discharge passage receiving these last products, disposed beside the discharge passages for the flotation products of the first and second containers.

References Cited in the file of this patent

UNITED STATES PATENTS

| | | |
|---|---|---|
| 2,700,466 | Logue | Jan. 25, 1955 |
| 2,721,658 | Tromp | Oct. 25, 1955 |
| 2,795,331 | Douy | June 11, 1957 |
| 2,899,057 | Menzies | Aug. 11, 1959 |